July 4, 1967
O. G. BAKKE ET AL
3,329,015
STABILIZED BUOY ASSEMBLY
Filed June 7, 1963
2 Sheets-Sheet 2
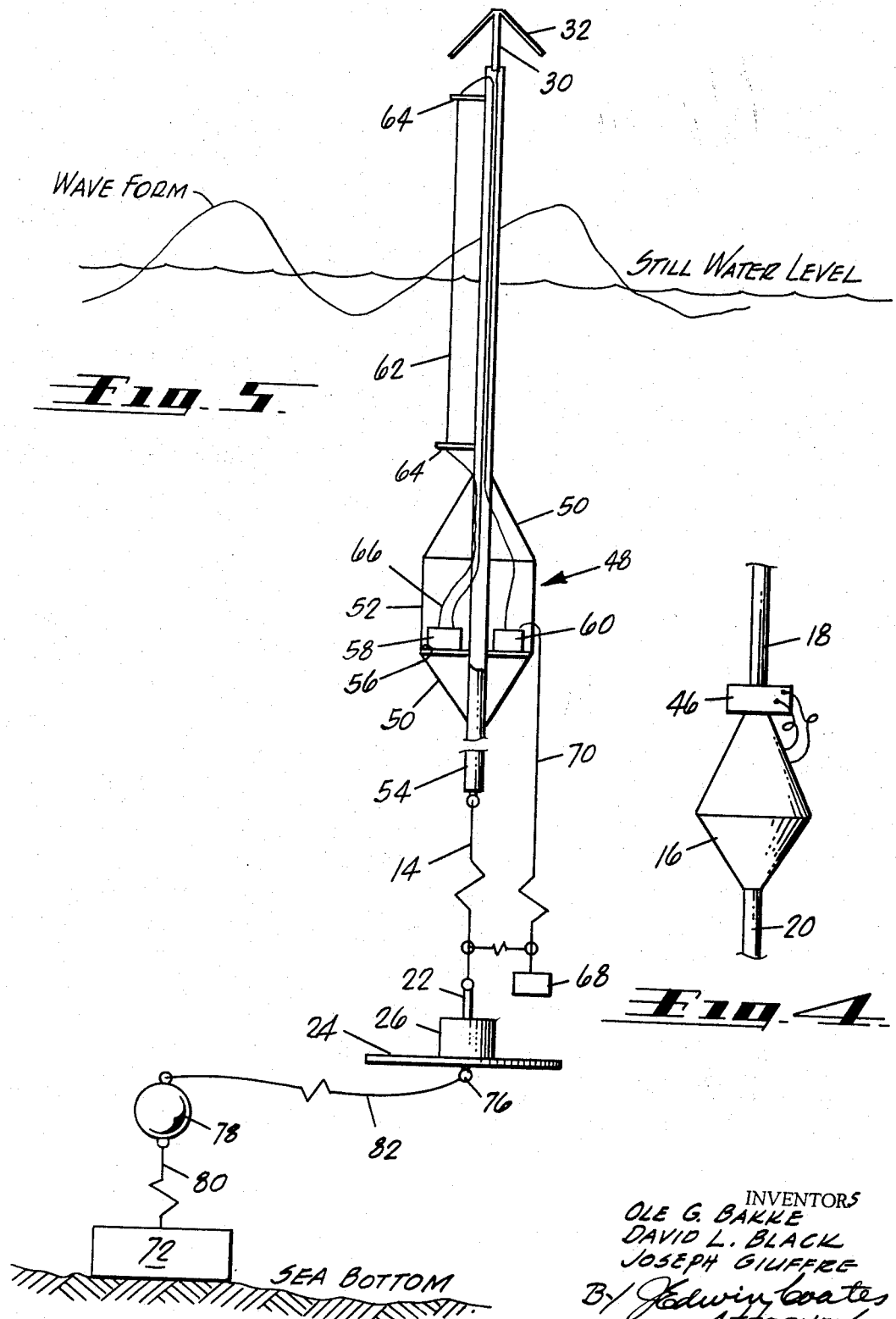
INVENTORS
OLE G. BAKKE
DAVID L. BLACK
JOSEPH GIUFFRE
By Edwin Coates
ATTORNEY

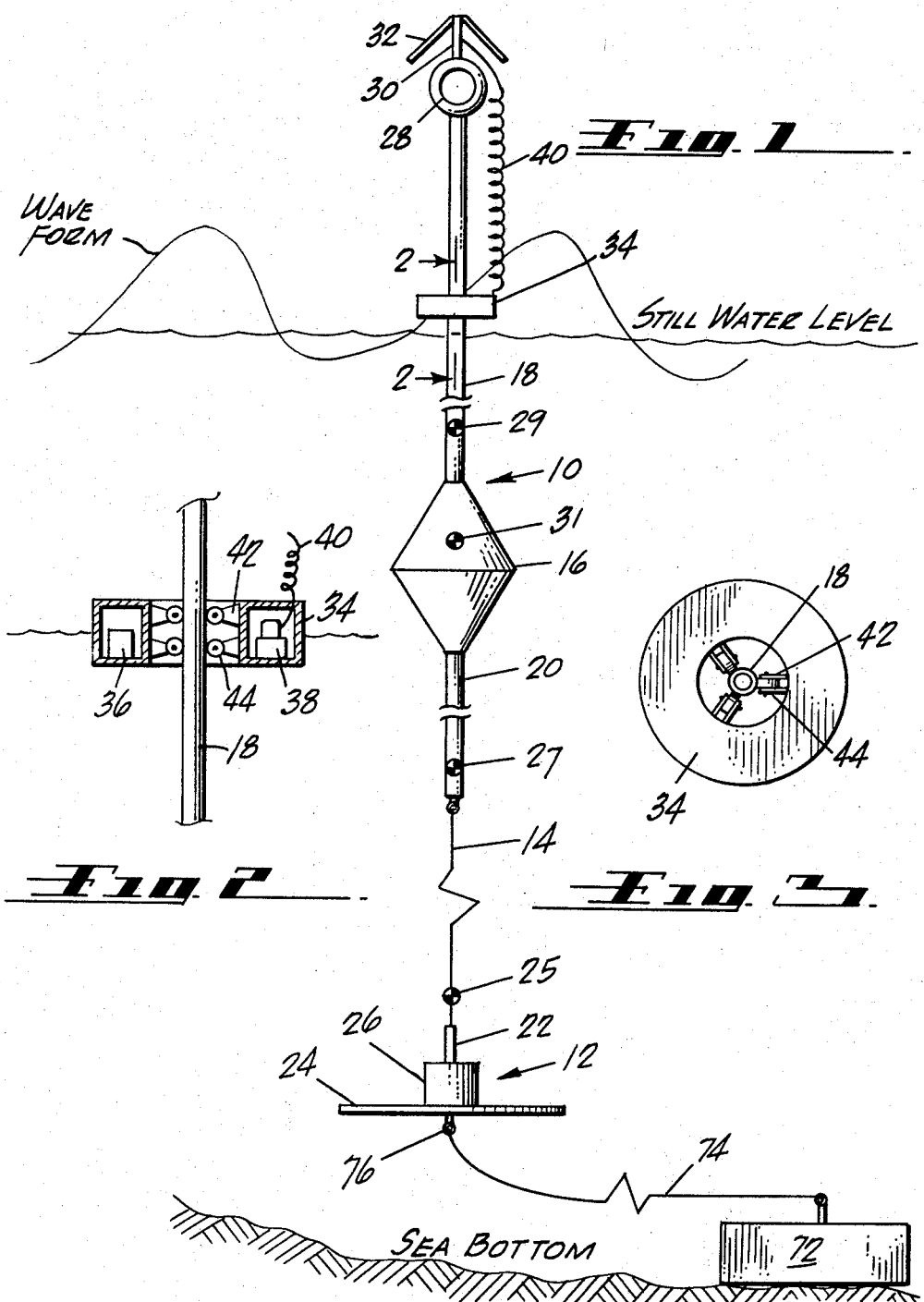

United States Patent Office 3,329,015
Patented July 4, 1967

3,329,015
STABILIZED BUOY ASSEMBLY
Ole G. Bakke, Long Beach, David L. Black, Costa Mesa, and Joseph Giuffre, Fullerton, Calif., assignors, by mesne assignments, to Douglas Aircraft Company, Inc., Santa Monica, Calif.
Filed June 7, 1963, Ser. No. 286,251
4 Claims. (Cl. 73—170)

This invention relates to apparatus for determining wave action data and more particularly to apparatus which provides a stable reference to which oceanographic instruments can be attached.

In recent years there has been an intensification of the study of the action of ocean waves, referred to as the sea state, particularly with regard to the spectral sea state; i.e., wave height vs. frequency. Among other things it is desirable to relate the varying spectral sea states to the action of the waves on the beaches so that extent and rate of erosion and other factors can be predicted with reasonable accuracy.

Various instruments have been devised and are presently being used with some success in the course of these studies. The work is usually conducted in fairly shallow water and it is possible to erect towers which are firmly secured to the ocean bed, and to mount instruments on the towers. Since the instruments can be held in absolutely fixed positions or can move with respect to fixed references they can accurately record all relative motions such as the height of the crests and troughs of the waves and the frequency or rate at which the crests pass the observation point.

Deep sea wave measurements present quite a different problem. The primary purposes of such measurements are prediction of vehicle performance (ships, sea launched rockets, etc.), supplementary information for weather forecasting, and the determination of acoustic background noise levels, as functions of sea state, to aid ASW (anti-submarine-warfare) operations. All of these purposes can be well served by lightweight, compact versions of the present invention. Larger scale versions will be used for synoptic instrumentation of oceanographic and meteorological phenomena and, when moored, as radio navigation stations for both ships and aircraft.

When it is sought to carry out operations of the type mentioned above in deep water it is impractical if not impossible to build towers for the purpose. Hence, resort has been had to floating platforms, anchored or free depending on the length of time involved in the particular test. While these platforms successfully carried the instruments the results were quite inaccurate because these platforms or rafts not only rose and fell with the waves but also pitched to an extent at least as great as the angularity of the surface of each passing wave.

When wave height was measured by the reaction of vertical sensing accelerometers, for instance, the readings were obviously affected in proportion to the angularity of the raft. To overcome this difficulty it was necessary to incorporate stable reference gyros, and even with this equipment the wavemeter accuracy (or error) has been of the order of 10 to 20 percent of maximum wave height. Since the deep water stations are obviously rather far from shore they usually include telemetering equipment which avoids the necessity for having the stations continuously manned during a test. Serious communications problems have been encountered because of the whipping motion of the telemetry antenna resulting from the severe wave induced motions of the raft. Under average sea state conditions the pitching or tilting motion of the mast is a minimum of about ±17 degrees.

These problems have been overcome by the novel construction and operation of the present invention which provides a reference which is unusually stable both in pitching and in heaving or vertical motion. In general the apparatus comprises a buoyant member to which an upwardly extending, slender, elongate shaft is attached. In one form of the invention a similar shaft, which can be continuous or integral with the first, extends downwardly from the buoyant member. To the lower free end of this shaft is flexibly coupled a slender, elongate tension member, preferably a length of flexible cable, and to the lower end of the cable is attached a ballast weight. The arangement is such that the center of gravity of the assembly is below the center of buoyancy and consequently the assembly will float in an upright attitude. The length of the cable is so chosen that the ballast weight will be clear of the ocean bed under all conditions of use. The weight need only be vertically below the still water level a distance equal to 50 to 100 percent of the maximum wave length between crests in order to operate in substantially undisturbed water; i.e., completely below the region of wave turbulence.

The total out-of-water weight of the assembly is chosen or adjusted so that it is just slightly less than its total water displacement (i.e., total volume, not submerged volume) preferably of the order of 95 percent, so that the assembly will free-float with a portion of the upper shaft, preferably about half, extending above the still water level. The total length of the shaft is somewhat greater than the maximum height of the waves to be measured; i.e., the total vertical distance between the crest and the trough. This will place the buoyant member some distance below the deepest trough where it will be substantially unaffected by the wave motion. The assembly is also usually provided with a sea anchor, desirably in the form of a plate which is carried at the lower end of the cable. The plate can be combined with the ballast weight or it can even be the ballast weight.

In a typical example of a workable design the upper shaft is a rod or pipe about two inches in diameter and about fourteen feet long. It has a displacement of about 1.26 pounds of water per foot of vertical height or, if the pipe is perforated to allow water to enter, about a half pound per foot. The total weight of the assembly is of the order of about 285 pounds. It will therefore be seen that as a wave passes and changes the effective water level the difference in buoyancy of the assembly is only a few percent of its total weight. In the example given, the device is designed for use with 12 foot waves, or plus or minus six feet from the neutral, or still water, flotation level of the shaft. The total buoyancy change is about 15 pounds. This is ±7.5 pounds from the equilibrium level or ±2.65 percent. Since it has substantial inertia it will react very slowly, and the vertical force effect of the passing wave will be reversed almost before the assembly begins to move. In addition the sea anchor plate adds a great deal of resistance to vertical movement. In this same example the plate was about three feet square and trapped a mass of approximately 1350 pounds of water in direct resistance to vertical movement of the system. Hence the device is almost completely stable with regard to vertical motion or heaving. In effect it amounts to a very light out-of-water system which acts as a much heavier system in water.

The horizontal component of the movement of individual water particles decreases very rapidly with depth and has very little effect on the buoyant member which is well below the trough of the wave. The upper shaft, or mast, is very small and preferably cylindrical and hence offers almost no resistance so that the movement of the water particles has very little tendency to cause the assembly to pitch. In analyzing the pitching motions, the buoyant member and mast combination (spar buoy) is effectively a free body rotating about its own center of mass rather than the center of mass of the entire system. When pitching occurs, the added water mass effect of the sea anchor plate, ballast weight assembly precludes any effective vertical motion of that assembly. The primary effect is a vertical motion of the spar buoy. This motion, however, will be negligible if pitching motions are small (less than 5 degrees). The restoring moment for pitching motions is a function of the average cable tension and the distance between the center of mass of the buoy (free body) and the cable attach point. Since any occurring motions are periodic, the average cable tension is equivalent to the static cable tension, i.e., the weight of water displaced by the spar buoy, minus the physical weight of the spar buoy.

With this extremely stable reference various kinds of instrumentation can be used with great accuracy. In one design a water pressure gauge is mounted at or near the buoyant member. Since the gauge remains almost exactly at a given point below the still water level the differences in gauge pressure are an accurate indication of the height of the water above it. In another design a float is mounted on the upper shaft or mast with rollers so that it will readily move vertically without tilting. An accelerometer mounted in or on the float will now give accurate readings without the use of a gyro or other complicating factors. In still another design a resistance wire is mounted on and parallel to the mast. The wire is a part of an electrical circuit which also includes a conventional sensor. The latter reads variations in the condition of the circuit resulting from varying submergence of the wire and converts them into indications of wave height.

In the operation of anti-submarine warfare listening devices it is essential to be able to distinguish the sounds emitted by enemy craft from standard background noise and in particular the intrinsic ambient noise. If the sound level resulting from various sea states can be recorded and its spectral content analyzed, then the listening devices (sonar, hydrophone, etc.) can be greatly improved and consequently the detection of enemy craft sounds can be facilitated. In any of the designs mentioned above, a hydrophone can be suspended below the buoyant member at any desired depth, and its signals can be transmitted to the other sensor mechanism so that all signals can be correlated and recorded or transmitted.

A telemetering antenna can be mounted to the top or free end of the mast and will function effectively and satisfactorily because the whipping motion is almost entirely eliminated.

Other advantages and features of novelty will become apparent as the description proceeds in connection with the accompanying drawings, in which:

FIG. 1 is a schematic view in elevation of the stabilized buoy assembly of the present invention carrying an accelerometer type sensing system;

FIG. 2 is a sectional view of the accelerometer float of FIG. 1, taken on line 2—2 of FIG. 1;

FIG. 3 is a top plan view of the float of FIG. 2;

FIG. 4 is a fragmentary schematic view in elevation of the assembly of FIG. 1 carrying a water pressure sensing system; and FIG. 5 is a view similar to FIG. 1 showing a modified form of the assembly carrying an electrical sensing system.

One presently preferred form of the invention is illustrated in FIG. 1, where the principal parts of the stabilized buoy assembly are shown as a buoyancy component 10 and a ballast component 12 secured together by an elongate flexible connector or tension member 14. The buoyancy component includes a main buoyancy section 16 which, in preferred form, is a substantially hollow buoyancy chamber, which may comprise a pair of cones base to base as shown in FIG. 1 or joined by a cylindrical section as shown in FIG. 5. While any suitable shape of the necessary displacement may be used, these have been particularly satisfactory in practice.

The buoyancy component further includes an upward extension 18 which is here shown as a uniform cylindrical shaft or mast. It may be a solid bar but is desirably a length of pipe for lightness. It is rigidly secured to chamber 16 to maintain the relation shown. The connector 14, usually a length of cable, may be attached directly to the bottom of chamber 16 but, for reasons which will be outlined later, the component includes a downward extension 20, also in the form of a shaft or spar which is rigidly secured to chamber 16. The upper end of member 14 is secured to the lower free end of shaft 20 and its lower end is attached to pin 22. On the latter are mounted a sea anchor 24 in the form of a flat plate and a ballast weight 26. The dimensions are so chosen that the center of gravity 25 of the assembly is below its center of buoyancy 27, as indicated in FIG. 1, so that its attitude is always upright.

At the upper end of shaft 18 is attached a recovery ring 28 surmounted by post 30 carrying conventional telemetering antenna 32. Instrument packages for various purposes may be mounted within chamber 16 or on shafts 18 or 20. The entire assembly, including any instrument packages fixedly carried thereby, is so designed that its total out-of-water weight is just enough less than its total water displacement so that it will free-float in equilibrium in still water with approximately one half of shaft 18 extending above the still water level. For any given operation the total length of shaft 18 is selected to be slightly greater than the maximum trough to crest height of any anticipated waves.

It will be observed that the lateral extent or cross-sectional area of chamber 16 is very substantial compared to that of shaft 18. In fact, the diameter of the shaft is greatly exaggerated for clarity of illustration and in a typical case it is of the order of two inches while the chamber may be two to three feet in diameter and three feet high. With this configuration the total water displacement of the shaft is only a small percentage of the displacement of the entire assembly, usually less than 10 percent, and its displacement per unit of length is extremely small. Once it has attained equilibrium with respect to still water level, at about its halfway mark, it can be seen that a transient change in water level caused by a passing wave will disturb the equilibrium forces by only a few percent of the total weight of the assembly. Preferably the dimensions are so chosen that the disturbance by a maximum height wave will be somewhat less than ±3%. The value may be as high as ±5% with reasonably good results, but the lower figure is more desirable.

Shaft 18 as shown is just slightly longer than the maximum wave height. This can be considered as the "active" section of the extension and should be of small substantially uniform cross-sectional area regardless of its construction. For special purposes the extension may be considerably longer and may have various cross-sectional areas above and below wave action without affecting the basic function of the assembly so long as the "active" section is substantially uniform.

Since the buoyancy disturbance of passing waves increases, decreases, and reverses relatively quickly it will be apparent that the displacement relationships set forth above would alone result in high stability against vertical movement because of the inertia inherent in the mere weight of the assembly. However, another factor of great importance is brought in by the use of the sea anchor 24. The anchor may be annular or any other suitable shape but, in the example given, is square and about three feet on a side. When an incipient change in buoyancy caused by a passing wave tends to accelerate the sea anchor vertically it traps a great mass of water—in this case about 1350 pounds—which must be moved with the sea anchor. It can be seen that the buoyant force of a maximum wave on the entire upper half of shaft 18 is relatively so slight that the vertical movement is almost insignificant. The force fades and reverses so quickly that there is no sustained movement, and the weight of the ballast component is always working to return the assembly to equilibrium.

The water disturbance of the wave motion is greatest at the surface and decreases in effect with increase in depth. The ballast component works most effectively in undisturbed water, and it has been determined that the ballast component should be submerged a distance equal to 50 to 100 percent of the maximum distance between wave crests of a given sea state. Any greater depth is satisfactory but not necessary.

Pitching moments are produced by the horizontal forces applied to the buoyancy component 10 by the water particle movements resulting from the wave motion. These moments are greatly reduced by the design of the present invention because the major portion of the assembly is at all times submerged well below the minimum water level and out of range of water particle movement. A water particle at the surface moves in a vertical plane in a circle whose diameter is equal to the wave height. Each succeeding downwardly located particle moves in a smaller circle and the radii of the circles decrease rapidly with depth. Thus, the maximum particle movement occurs in the location of shaft 18 which has a small frontal area and the minimum particle movement occurs in the location of the upper part of buoyancy chamber 16. The summation of the horizontal forces resulting from the wave motion can be considered as concentrated at a single point 29 on shaft 18, which is therefore the center of pressure or wave force. By locating the center of gravity or center of mass 31 of the buoyancy component close to and preferably slightly below, the center of pressure 29 the moment arm is minimized and hence the pitching moment is minimized. Since the ballast component 12 is attached to the buoyancy component 10 only by the flexible cable 14 no inertial coupling is effected, and the buoyancy component is effectively a free body rotating about its own center of mass rather than about the center of mass of the entire system. The cable could be replaced by a flexibly coupled rod or shaft but this introduces complicating factors which are not present in the preferred form.

As previously stated, cable 14 could be attached directly to the bottom of chamber 16, which is actually a downward extension of the main buoyancy section, but in normal design such point is too close to the center of mass to provide a suitable moment arm. Therefore, to produce best results, a more elongated extension is desired and is here provided in the form of shaft or spar 20, which is rigidly connected to chamber 16. When the spar buoy 10 is urged to pitch about its own center of mass, shaft 20 acts as a lever trying to raise the almost immovable ballast component. The result is primarily a small degree of pitch about the connection between the shaft and the cable, slightly lowering the spar buoy. The angularity of the latter produces a horizontal moment arm between the attach point of the cable to the shaft and the vertical projection of the center of mass of the buoyancy component. The weight of the ballast component exerts a downward force on the attach point producing a strong righting moment. Because of the various factors outlined above, pitching is very strongly inhibited and rapidly corrected and seldom reaches a value of five degrees from vertical except in unusually severe circumstances. The geometric error effect of the first few degrees of pitching is very slight but the ±17 degree pitching of previous systems produces errors in readings of as much as 15 or 20 percent.

Thus it will be seen that the present invention produces a stable reference for deep water wave study which is comparable to the fixed towers used in shallow water work. In fact it presents a very substantial advantage thereover because it is a stable reference with respect to the still water level rather than the sea bottom, and therefore there is no need to make calculations, adjustments, or corrections for the tide effects.

With this highly stable reference it is now possible to make accurate observations of the spectral sea state with many different sensing devices, several of which are shown in the drawings. In FIG. 1 a float member 34 is shown movably mounted to shaft 18 to float at the surface and rise and fall with the wave forms. In its presently preferred form, as shown in FIGS. 2 and 3, it is a generally torus shaped hollow member surrounding shaft 18 and housing instrumentation devices such as an accelerometer 36 and signal converter and transmitter means 38, the latter being connected by conductor 40 to the telemetering antenna 32. To facilitate movement along the shaft, the float is provided, as seen in FIGS. 2 and 3, with radially inwardly extending brackets 42 carrying rollers 44 to contact the shaft and provide anti-friction guidance.

Another type and arrangement of sensing device is illustrated in FIG. 4, where a water pressure gauge 46 is mounted directly on shaft 18 or the upper end of chamber 16, with electrical conductors leading to instrumentation, not shown, within the chamber. Since the gauge is maintained at an almost exactly constant depth below the still water level, the variations in the pressure will be proportional to the height of the water above it as the waves pass, and simple, well known instrumentation can convert the pressure readings to wave height and transmit appropriate signals. The gauge can be mounted below chamber 16 or within it with a pressure conduit to the exterior, but the arrangement shown is very satisfactory.

A slightly modified buoy assembly is shown in FIG. 5, in which the buoyancy chamber 48 is formed of two conical sections 50 joined by a cylindrical section 52, and the upper and lower extensions consist of a single shaft 54, such as a length of pipe, passing directly through the chamber. A floor or bulkhead 56 extends across the diameter of the chamber and supports instrumentation units 58 and 60. A third type of sensing device includes resistance wire 62 attached to spar 54 by brackets 64, together with conductors 66 completing a circuit which includes instrumentation unit 58. Variations in the submergence of wire 62 change the electrical characteristics of the circuit, which are read and translated by unit 58. With proper design changes the spar 54 can serve as part of the return circuit.

In some cases it is desired to correlate the acoustic background noise with the spectral sea state. In ASW work, for instance, it has always been difficult to distinguish sounds made by an enemy vessel from the background ambient noise which is always present to some extent. It would be very helpful if the true nature of this type of noise and its variation as a function of depth and sea state could be fully understood. An added feature of the present invention is very helpful in this regard. As seen in FIG. 5, a hydrophone 68 is suspended below the buoyancy chamber 48, in this case by means of its own conductor cables 70, and may be located at any desired depth. It may hang free or be connected to cable 14, as shown, to prevent independent drift. Signals from the hydrophone are fed to unit 60 where they are correlated with the information derived by unit 58. They may then be recorded, or telemetered from antenna 32, or both. With a recording of the signals it is now possible to make correlation studies between the various sea states and sound levels, thus improving the detection apparatus used in ASW systems.

The drift of the buoy assembly of this invention is so slight that it need not be moored for the periods of time involved in most investigations. However, for very long duration work, or when the assembly is to support navigation aids, mooring is necessary. One arrangement is illustrated in FIG. 1, where a bottom anchor 72 lies on the sea bottom and is connected by cable 74 to ring 76 at the lower end of pin 22. As explained above, the buoy assembly must be free-floating at all times to seek its proper level, and therefore the weight of anchor 72 must never exert vertical tension on ring 76. In any given case, when a location is chosen the depth of the sea bottom at that point is determined, and cable 74 is selected or adjusted to have a length substantially greater than the vertical distance from the sea bottom to the suspended height of the ballast component, preferably several times as great. With such arrangement the cable will extend generally horizontally, as shown in FIG. 1, and will not interfere with the designed operation of the buoy assembly but will exert an adequate horizontal restraint against drift.

A more refined version of the mooring is shown in FIG. 5 in which the bottom anchor 72 is secured to a float 78 by means of a cable 80 having a length approximately equal to the vertical distance from the bottom anchor to the ballast component. The float in turn is connected to ring 76 by cable or rod 82 of any desired length, which may be rather short, the connector extending generally horizontally from the float to the ballast component.

The extensions above and below the main buoyancy section may take any suitable form, such as an openwork structure, but the mast-like arrangement shown in the drawings is the simplest and most compact and has been found to be very well suited for the purpose. In some cases when conditions are not severe the ballast weight may be used alone without a sea anchor. In other cases, by making the sea anchor larger or thicker it can be made to serve both functions of dead weight and water trap.

It will be apparent to those skilled in the art that various changes and modifications may be made in the construction and arrangement of parts as illustrated and described without departing from the spirit of the invention, and it is intended that all such changes and modifications shall be embraced within the scope of the following claims.

We claim:

1. A free-floating, stabilized buoy assembly exhibiting only minor response to disturbing wave motions and serving as a stable reference for wave motion sensors, comprising: a buoyancy component and a ballast component; said buoyancy component including a main buoyancy section having a large lateral dimension and a large displacement, and an elongate upward extension having a relatively small cross-sectional area and a total displacement which is only a minor proportion of the displacement of the main buoyancy section and is less than 10 percent of the displacement of the buoy assembly; an extension secured to said main buoyancy section and extending downwardly therefrom and having a lower free end; a slender, elongate connector having its upper end flexibly coupled to the lower end of said downward extension; and said ballast component being secured to the lower end of said connector; the center of gravity of the assembly being below the center of buoyancy of the assembly; the total out-of-water weight of the assembly being just enough less than its total water displacement so that a portion of the upward extension will be above the still water level when the buoy assembly is free-floating; and in addition thereto, sensor means carried by said buoyancy component and acting to sense the instantaneous height of the water surface with respect to a reference point on said buoyancy component; a hydrophone carried by said buoyancy component to sense acoustical background noise; and means carried by said buoyancy component for correlating said noise and the sea state information gathered by said sensor means to provide a record of the correlation for use in segregating said noise from other signals.

2. A free-floating, stabilized buoy assembly and wave motion gauge, comprising: a buoyancy component and a ballast component; said buoyancy component including a main buoyancy section having a large lateral dimension and a large displacement, and a slender elongate shaft secured to said main buoyancy section and extending upward therefrom and having an upper free end, said shaft having a total displacement which is only a minor proportion of the displacement of the main buoyancy section; an extension secured to said main buoyancy section and extending downwardly therefrom and having a lower free end; a tension member secured to said lower free end and extending downwardly therefrom; and said ballast component being secured to the lower end of said tension member; the center of gravity of the assembly being below its center of buoyancy; the total out-of-water weight of the assembly being just enough less than its total water displacement so that a portion of the shaft will be above the still water level when the buoy assembly is free-floating; the ballast component resisting heaving and pitching movement of the buoyancy component and applying a restoring moment when the buoyancy component pitches about a point intermediate its length to maintain said shaft substantially upright and at a nearly constant level with respect to the still water level; a float member movably secured to said shaft for vertical movement along its length in response to wave motion; and a gauge operatively associated with said float; said gauge including means to measure the vertical movement of said float in response to wave motion.

3. The combination as claimed in claim 2; said gauge being an accelerometer carried by said float member to determine the acceleration of the latter.

4. A free-floating, stabilized buoy assembly and wave motion gauge, comprising; a buoyancy component and a ballast component; said buoyancy component including a main buoyancy section having a large lateral dimension and a large displacement, and a slender elongate shaft secured to said main buoyancy section and extending upward therefrom and having an upper free end, said shaft having a total displacement which is only a minor proportion of the displacement of the main buoyancy section; an extension secured to said main buoyancy section and extending downwardly therefrom and having a lower free end; a tension member secured to said lower free end and extending downwardly therefrom; and said ballast component being secured to the lower end of said tension member; the center of gravity of the assembly being below its center of buoyancy; the total out-of-water weight of the assembly being just enough less than its total water displacement so that a portion of the shaft will be above the still water level when the buoy assembly is free-floating; the ballast component resisting heaving and pitching movement of the buoyancy component and applying a restoring moment when the buoyancy component pitches about a point intermediate its length to maintain said shaft substantially upright and at a nearly constant level with respect to the still water level; a float member movably secured to said shaft for vertical movement along its length in response to wave motion; and a gauge operatively associated with said float; said gauge including means to measure the vertical movement of said float in response to wave motion; said float member having a generally central opening and surrounding said shaft; and rollers carried by said float member and engaging said shaft to facilitate wave induced vertical movement of said float member.

References Cited

UNITED STATES PATENTS

| | | | |
|---|---|---|---|
| 829,161 | 8/1906 | Kjerulff | 73—304 |
| 1,112,138 | 9/1914 | Hill et al. | 116—107 X |
| 2,447,069 | 8/1948 | Holcomb | 117—386 |
| 2,768,368 | 10/1956 | Crane et al. | |
| 2,839,920 | 6/1958 | MacAnespie | 73—170 |
| 2,869,108 | 1/1959 | Smith | 340—2 |
| 3,160,846 | 12/1964 | Gustafson et al. | 340—2 X |

(Other references on following page)

OTHER REFERENCES

Oceanographic Instrumentation Final Report of the Committee on Instrumentation. Second Edition. October 1960. U.S. Navy Hydrographic Office, Washington, D.C. GC 41 US 1960. (Pages VII-9 through VII-15 relied upon.)

Upham, Sidney H., Electric Wave Staff, U.S. Navy Hydrographic Office, Washington, D.C. Technical Report Number 9. March 1955. (Page 2 relied upon.)

JAMES J. GILL, *Acting Primary Examiner.*

RICHARD C. QUEISSER, JOHN P. BEAUCHAMP, *Examiners.*

J. J. SMITH, *Assistant Examiner.*